(12) United States Patent
Yamagiwa et al.

(10) Patent No.: US 9,013,136 B2
(45) Date of Patent: Apr. 21, 2015

(54) MOTOR AND DRIVE SYSTEM PROVIDED THEREWITH

(75) Inventors: Akio Yamagiwa, Shiga (JP); Toshinari Kondou, Shiga (JP); Yoshihito Sanga, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 65 days.

(21) Appl. No.: 13/499,169

(22) PCT Filed: Sep. 29, 2010

(86) PCT No.: PCT/JP2010/005872
§ 371 (c)(1),
(2), (4) Date: Mar. 29, 2012

(87) PCT Pub. No.: WO2011/040020
PCT Pub. Date: Apr. 7, 2011

(65) Prior Publication Data
US 2012/0187877 A1 Jul. 26, 2012

(30) Foreign Application Priority Data

Sep. 30, 2009 (JP) ................. 2009 226418

(51) Int. Cl.
*H02P 21/06* (2006.01)
*H02K 7/06* (2006.01)
*H02P 27/04* (2006.01)
*H02K 1/27* (2006.01)
*H02K 21/16* (2006.01)
*B60L 15/20* (2006.01)

(52) U.S. Cl.
CPC .............. *H02K 1/2766* (2013.01); *H02K 1/276* (2013.01); *H02K 21/16* (2013.01); *H02K 2213/03* (2013.01); *B60L 15/2045* (2013.01); *B60L 2270/142* (2013.01); *B60L 2270/145* (2013.01); *B60L 2220/50* (2013.01); *Y02T 10/644* (2013.01); *Y02T 10/641* (2013.01); *Y02T 10/7283* (2013.01)

(58) Field of Classification Search
None
See application file for complete search history.

(56) References Cited

U.S. PATENT DOCUMENTS

| | | | | |
|---|---|---|---|---|
| 5,804,939 | A * | 9/1998 | Yamai et al. | 318/400.01 |
| 5,844,344 | A * | 12/1998 | Uetake et al. | 310/156.49 |
| 2002/0175584 | A1* | 11/2002 | Koharagi et al. | 310/156.56 |
| 2003/0052640 | A1* | 3/2003 | Iwaji et al. | 318/700 |

(Continued)

FOREIGN PATENT DOCUMENTS

| | | |
|---|---|---|
| JP | 8-331823 A | 12/1996 |
| JP | 2002-51589 A | 2/2002 |
| JP | 2002-84722 A | 3/2002 |

(Continued)

OTHER PUBLICATIONS

Full English-language machine translations for JP-2002-51589-A dated Feb. 15, 2002.
Full English-language machine translations for JP-2009-112181-A dated May 21, 2009.

*Primary Examiner* — Eduardo Colon Santana
*Assistant Examiner* — Devon Joseph
(74) *Attorney, Agent, or Firm* — Birch, Stewart, Kolasch & Birch, LLP (57) ABSTRACT

A three-phase AC motor (4) has a configuration in which a q-axis inductance is larger than a d-axis inductance by a predetermined amount or more to allow smoothing of power fluctuations due to the power supply voltage of the AC power source (3).

8 Claims, 4 Drawing Sheets (56) References Cited

U.S. PATENT DOCUMENTS

2007/0085508 A1* 4/2007 Fujitsuna et al. ............. 318/712
2012/0187877 A1* 7/2012 Yamagiwa et al. ...... 318/400.02

FOREIGN PATENT DOCUMENTS

| JP | 2009-112181 A | 5/2009 |
| WO | WO 95/27328 A1 | 10/1995 |

* cited by examiner

MOTOR AND DRIVE SYSTEM PROVIDED THEREWITH

TECHNICAL FIELD

The present invention relates to a motor which is driven and controlled by a power conversion device including a converter section and an inverter section.

BACKGROUND ART

Conventionally, motors configured to be driven and controlled by a power conversion device including a converter section which rectifies AC power of an AC power source and an inverter section which converts an output of the converter section into AC power at a predetermined frequency have been known. In a conventional power conversion device for driving and controlling a motor, a capacitor such as an electrolytic capacitor which has a relatively large capacitance is provided at an output side of the converter section in order to smooth voltage fluctuations due to a power supply voltage of the AC power source.

For Example, as disclosed in PATENT DOCUMENT 1, a configuration in which reduction in size of a rectifier section and cost reduction are achieved by changing an electrolytic capacitor which has a large capacitance and can smooth voltage fluctuations due to a power supply voltage to a capacitor which has a small capacitance and can smooth only voltage fluctuations generated when switching operations of switching elements of the inverter section are performed has been known.

CITATION LIST

Patent Document

PATENT DOCUMENT 1: Japanese Patent Publication No. 2002-51589

SUMMARY OF THE INVENTION

Technical Problem

When a smoothing capacitor is changed to a capacitor having a capacitance with which only voltage fluctuations generated when switching operations of switching elements of an inverter section are performed can be smoothed as described above, the capacitor, unlike the smoothing capacitor, cannot smooth voltage fluctuations due to a power supply voltage of an AC power source. Therefore, a voltage with the remaining voltage fluctuations is supplied to a motor side, and ripple of torque arises in the motor. Accordingly, the rotational speed of the motor fluctuates, and vibration and noise are increased in the motor.

In the above-described power conversion device including a capacitor having a small capacitance, a current supplied to the motor side also rippled, and thus, a copper loss caused in a motor coil is greatly increased. Furthermore, when a current of the motor is rippled as described above, a magnetic flux generated in the motor is also rippled, and thus, an iron loss is increased.

In view of the above-described points, the present invention has been devised and it is therefore an object of the present invention to provide a configuration which allows reduction in vibration, noise, and increase in loss which are caused by ripple of power supplied to a motor which is driven and controlled by a power conversion device including a capacitor having a capacitance with which voltage fluctuations due to a power supply voltage cannot be smoothed but voltage fluctuations generated when switching operations of switching elements of an inverter section are performed can be smoothed.

Solution to the Problem

To achieve the above-described object, in a motor (4) according to the present invention, to allow absorption of power fluctuations due to a power supply voltage of an AC power source (3) at the motor (4) side, a q-axis inductance and a d-axis inductance which are defined in the dq axes equivalent circuit method are set so that the q-axis inductance is larger than the d-axis inductance by a predetermined amount or more.

Specifically, a first aspect of the present invention is directed to a motor which is driven and controlled by a power conversion device (2) including a converter section (11) configured to rectify AC power of an AC power source (3), an inverter section (13) including a plurality of switching elements (Su, Sv, Sw, Sx, Sy, Sz) and configured to perform switching operations of the switching elements (Su, Sv, Sw, Sx, Sy, Sz) to convert output power of the converter section (11) into AC power at a predetermined frequency, and a capacitor (12a) provided in an output side of the converter section (11) and having a static capacitance with which voltage fluctuations due to a power supply voltage of the AC power source (3) cannot be smoothed but voltage fluctuations generated when the switching operations of the switching elements (Su, Sv, Sw, Sx, Sy, Sz) are performed can be smoothed.

In the motor (4), a q-axis inductance is larger than a d-axis inductance by a predetermined amount or more to allow smoothing of power fluctuations due to the power supply voltage of the AC power source (3).

With the above-described configuration, even when the capacitor (12a) has only a static capacitance with which voltage fluctuations due to the power supply voltage of the AC power source (3) cannot be smoothed, the voltage fluctuations can be absorbed at the motor (4) side. That is, the motor (4) is configured so that the q-axis inductance in the motor (4) is larger than the d-axis inductance by a predetermined amount. Thus, the power fluctuations due to the voltage fluctuations can be stored as magnetic coenergy determined by a difference between the q-axis inductance and the d-axis inductance in the motor (4), and the power fluctuations can be smoothed by the motor (4). Therefore, increase in vibration and noise in the motor (4) can be prevented, and also, increase in loss such as a copper loss and an iron loss can be prevented.

The motor (4) of the first aspect of the present invention further includes a rotor (31) including a plurality of magnets (33) buried therein, and a magnetic flux generated from the magnets (33) is a predetermined magnetic flux with which a motor terminal voltage is equal to or less than an input voltage of the power conversion device (2) (a second aspect of the present invention).

As in the first aspect of the present invention, when the q-axis inductance is caused to be larger than the d-axis inductance, a magnetic flux in the motor (4) is increased. In an interior permanent magnet type motor (IPM) in which the magnets (33) are buried inside the rotor (31), a magnetic flux due to the magnets (33) of the rotor (31) is also generated as well as the magnetic flux in the motor (4), and thus, problems such as saturation of magnetic flux and increase in motor terminal voltage, etc. arise in the rotor (31). Accordingly, the performance of the motor (4) might be degraded, and when the motor terminal voltage exceeds the input voltage of the power conversion device (2), the motor (4) might lose speed and stop.

On the contrary, by configuring the motor (4), as described above, so that the magnetic flux generated from the magnets (33) has a predetermined value with which the motor terminal voltage is equal to or less than the input voltage of the inverter section. Thus, the motor terminal voltage can be prevented from exceeding the input voltage of the power conversion device (2) while saturation of magnetic flux in the rotor (31) is prevented. That is, as described above, even when the magnetic flux in the motor (4) is increased by causing the q-axis inductance to be larger than the d-axis inductance by a predetermined amount or more, problems caused by increase in magnetic flux in the motor (4) can be solved by reducing the magnetic flux of the magnets (33) by a corresponding amount.

Therefore, even when the capacitor (12a) has only a static capacitance with which the power fluctuations due to the power supply voltage of the AC power source (3) cannot be smoothed, increase in vibration, noise, and loss of the motor (4) can be prevented without losing the function as a motor.

In the motor of the first or second aspect of the present invention, in the rotor (31) including a plurality of magnets (33) buried therein, the magnets (33) are arranged at positions in a radial direction of the rotor (31) so that a q-axis magnetic flux in the rotor (31) is not blocked by a magnetic resistance of the magnets (33) (a third aspect of the present invention).

Thus, blocking of the q-axis magnetic flux by a magnetic resistance of the magnets (33) is not caused by the q-axis magnetic flux generated from the stator (21) side and the magnetic flux generated from the magnets (33) in the rotor (31), so that the q-axis magnetic flux can be increased. Therefore, the configuration of the first aspect of the present invention can be realized without losing the function as a motor.

Specifically, in the motor of the third aspect of the present invention, the magnets (33) are preferably arranged in the rotor (31) so that each of parts of the magnets (33) provided closest to a shaft center of the rotor (31) is located at a distance equal to or less than ½ of a thickness of a part of the rotor (31) serving as a magnetic pole in the radial direction (a fourth aspect of the present invention). Thus, a magnetic flux inflow/outflow area which is ½ of a surface area of a magnetic pole surface area of the rotor (31) and a magnetic flux passing surface in the rotor (31) are caused to be equal to each other, saturation of the magnetic flux in the rotor (31) can be more reliably and more greatly reduced, and the q-axis magnetic flux can be increased.

According to any one of the first through fourth aspects of the present invention, the rotor (31) including a plurality of magnets (33) buried therein includes magnetic flux barrier sections (32b) configured to prevent a short-circuit of a magnetic flux between the plurality of magnets (33), and the magnets (33) and the magnetic flux barrier sections (32b) are arranged along a flow of a q-axis magnetic flux (a fifth aspect of the present invention).

Thus, a flow of the q-axis magnetic flux, only a small amount of which leaks can be formed in the rotor (31), so that the q-axis magnetic flux can be increased. Therefore, the q-axis inductance can be reliably increased to be larger than the d-axis inductance, and the configuration of the first aspect of the present invention can be more reliably realized.

Moreover, in the motor of any one of the first through fifth aspects of the present invention, in the rotor (31) including a plurality of magnets (33) buried therein, a thickness of the magnets (33) in a radial direction of the rotor (31) is four times or more as large as an air gap between the rotor (31) and a stator (21) (a sixth aspect of the present invention).

Thus, the flow of the d-axis magnetic flux in the rotor (31) is blocked, so that the d-axis magnetic flux can be reduced, and the d-axis inductance in the motor (4) can be reduced. Therefore, with this configuration, the configuration of the first aspect of the present invention can be realized.

Also, in any one of the first through sixth aspects of the present invention, the magnets (33) are provided along a flow of a q-axis magnetic flux in the rotor (31) so that two or more of the magnets (33) are arranged in parallel in a radial direction of the rotor (31) (a seventh aspect of the present invention).

Thus, the d-axis magnetic flux is reduced by the magnets (33) arranged in parallel in the radial direction in the rotor (31), and the q-axis magnetic flux is increased by the magnets (33) provided along the flow of the q-axis magnetic flux. Accordingly, a difference between the q-axis inductance and the q-axis inductance can be reliably increased, and power fluctuations can be more reliably absorbed in the motor (4).

An eighth aspect of the present invention relates to a motor drive system. Specifically, a motor drive system according to the eighth aspect of the present invention includes the power conversion device (2) and the motor (4) of any one of the first through seventh aspects of the present invention.

With any one of the above-described configurations, even when power fluctuations due to a power supply voltage cannot be absorbed at the power conversion device (2) side, the power fluctuations can be absorbed at the motor (4) side, and the motor (4) can be driven with low vibration, low noise, and high efficiency.

Advantages of the Invention

In the motor (4) according to the present invention, even when the capacitor (12a) having a static capacitance with which voltage fluctuations due to the power supply voltage of the AC power source (3) cannot be smoothed but voltage fluctuations generated when switching operations of the switching elements (Sv, Sw, Sx, Sy, Sz) are performed can be smoothed, power fluctuations can be absorbed at the motor (4) side. Therefore, the motor (4) which can be driven with lower vibration, lower noise, and higher efficiency than those of conventional motors can be realized.

According to the second aspect of the present invention, even with the configuration of the first aspect of the present invention, the motor terminal voltage does not exceed the input voltage of the power conversion device (2). Thus, the motor (4) does not lose speed and can perform normal rotational movement of the motor (4).

According to the third aspect of the present invention, the q-axis magnetic flux in the rotor (31) can be increased without being blocked by the magnetic resistance of the magnets (33). Therefore, power fluctuations can be more reliably absorbed at the motor (4) side without losing the function as the motor (4). Specifically, according to the fourth aspect of the present invention, saturation of the q-axis magnetic flux in the rotor (31) can be more reliably and more greatly reduced, so that the q-axis magnetic flux can be further increased.

According to the fifth aspect of the present invention, a flow of the q-axis magnetic flux, only a small amount of which leaks can be formed in the rotor (31), so that the q-axis magnetic flux can be increased. Accordingly, the q-axis inductance can be increased, and a large amount of power can be stored in the motor (4).

According to the sixth aspect of the present invention, the d-axis magnetic flux in the rotor (31) can be reduced, so that the difference between the q-axis inductance and the d-axis inductance can be increased. Thus, a large amount of power can be stored in the motor (4).

According to the seventh aspect of the present invention, the q-axis magnetic flux can be increased while the d-axis magnetic flux in the rotor (31) is reduced. Thus, a large amount of power can be stored in the motor (4), and power fluctuations can be more reliably smoothed.

With the motor drive system (1) of the eighth aspect of the present invention, the motor (4) which can be driven with lower vibration, lower noise, and higher efficiency than those of conventional motors can be realized.

DESCRIPTION OF EMBODIMENTS

Hereinafter, embodiments of the present invention will be described with reference to the accompanying drawings. Note that the following embodiments are set forth merely for purposes of preferred examples in nature, and are not intended to limit the scope, applications, and use of the invention.

—Overall Configuration of Motor Drive System—

Figure 1:
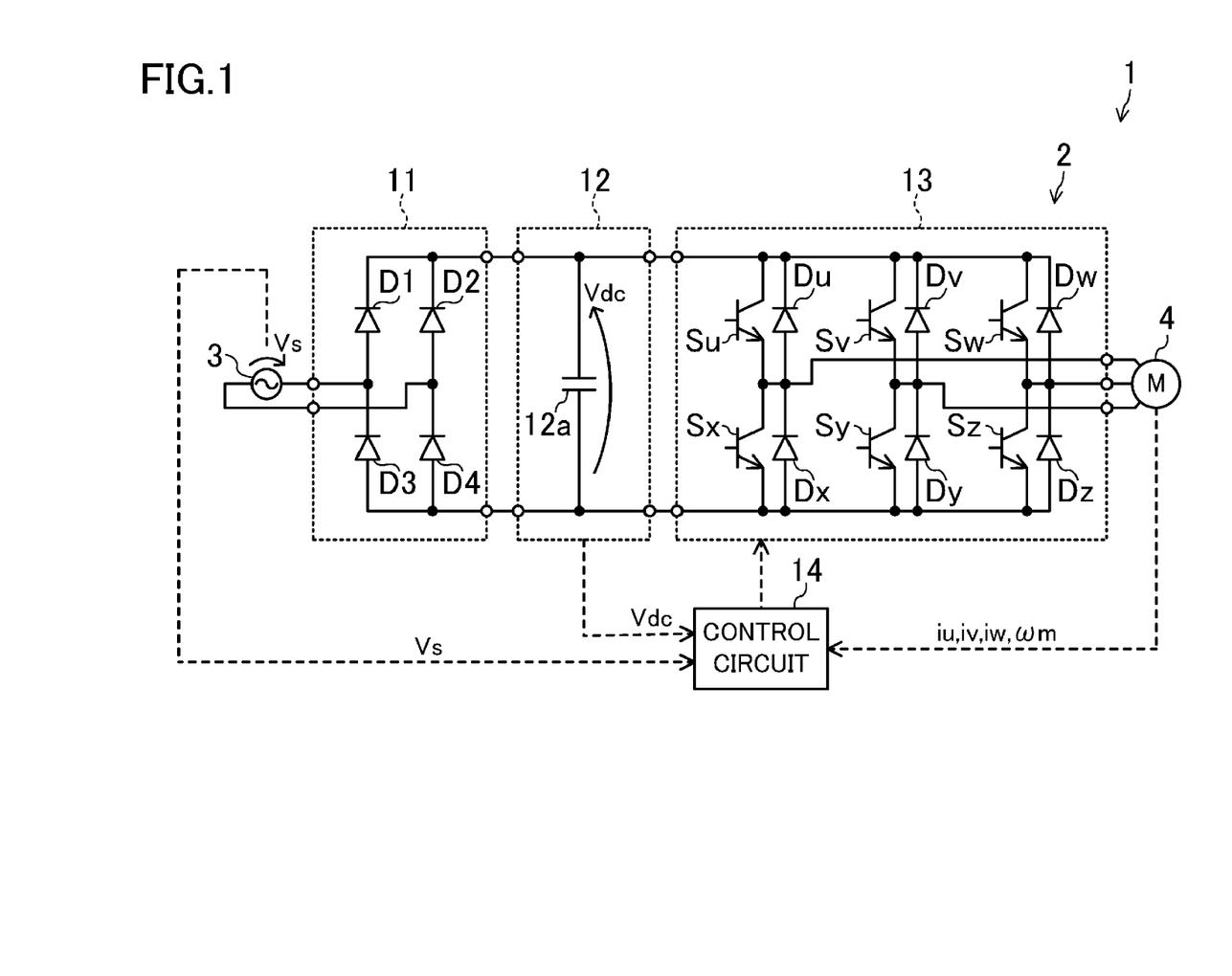
FIG. 1 is a circuit diagram illustrating a schematic configuration of a motor drive system according to an embodiment of the present invention.

FIG. 1 schematically illustrates a schematic configuration of a motor drive system (1) according to an embodiment of the present invention. The motor drive system (1) includes a power conversion device (2) which performs power conversion, an AC power source (3) which supplies power to the power conversion device (2), and a three-phase AC motor (4) which is driven and controlled by the power conversion device (2).

The power conversion device (2) includes a converter circuit (11) (a converter section), a capacitor circuit (12) including a capacitor (12*a*), and an inverter circuit (13) (an inverter section), and is configured to convert AC power supplied from the AC power source (3) to power at a predetermined frequency and supplies the power to the three-phase AC motor (4). Note that the three-phase AC motor (4) is provided, for example, to drive a compressor provided in a refrigerant circuit of an air conditioner.

The converter circuit (11) is connected to the AC power source (3) and is configured to rectify an AC voltage. The converter circuit (11) is a diode bridge circuit including a plurality of diodes (D1-D4) (four diodes in this embodiment) connected together in a bridge arrangement, and is connected to the AC power source (3).

Figure 3:
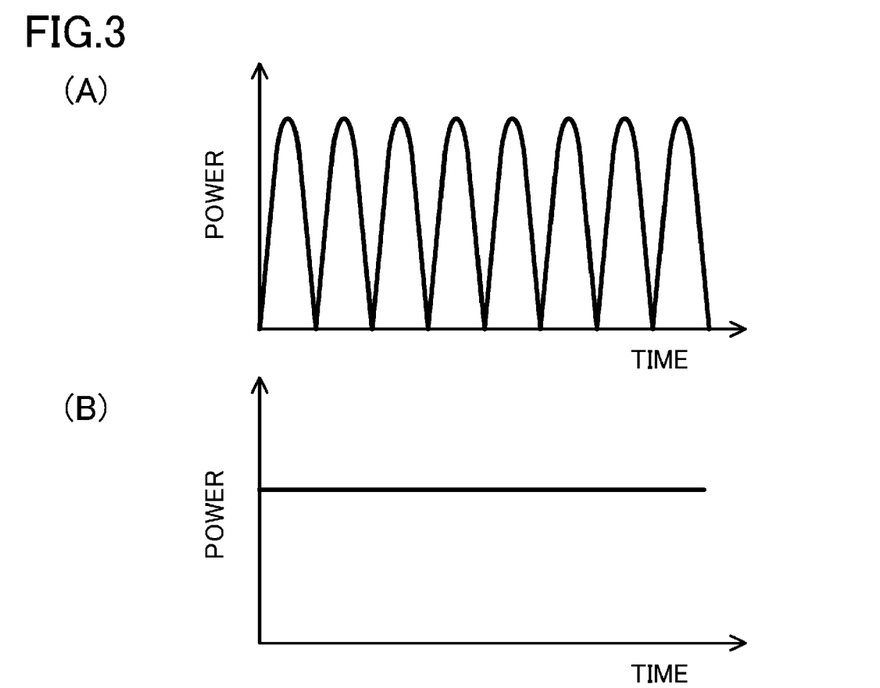
FIG. 3 shows waveform charts schematically illustrating (A) a waveform when power fluctuates, and (B) a waveform when fluctuations are smoothed by a motor.

The capacitor circuit (12) is provided between the converter circuit (11) and the to inverter circuit (13). The capacitor circuit (12) includes the capacitor (12*a*) formed of for example, a film capacitor, etc. The capacitor (12*a*) has a static capacitance with which only a ripple voltage (voltage fluctuations) generated when switching operations (which will be described later) of switching elements (Su, Sv, Sw, Sx, Sy, Sz) of the inverter circuit (13) are per formed can be smoothed. That is, the capacitor (12*a*) is a small capacitance capacitor which cannot smooth a voltage (voltage fluctuations due to a power supply voltage), such as a voltage shown in FIG. 3A, which has been rectified by the converter circuit (11).

The inverter circuit (13) is connected to an output side of the converter circuit (11) in parallel to the capacitor (12*a*). The inverter circuit (13) includes the plurality of switching elements (Su, Sv, Sw, Sx, Sy, Sz) (for example, six switching elements in a three-phase inverter circuit) connected together in a bridge arrangement. That is, the inverter circuit (13) includes three switching legs each of which includes two switching elements connected together in series, and in each of the switching legs, a midpoint of each of the switching element (Su, Sv, Sw) at an upper arm and an associated one of the switching element (Sx, Sy, Sz) at a lower arm is connected to a stator coil (23) of each phase of the three-phase AC motor (4).

The inverter circuit (13) converts an input voltage into a three-phase AC voltage at a predetermined frequency by on/off operations of the switching elements (Su, Sv, Sw, Sx, Sy, Sz) to supply the three-phase AC voltage to the three-phase AC motor (4). Note that in this embodiment, freewheel diodes (Du, Dv, Dw, Dx, Dy, Dz) are respectively connected to the switching elements (Su, Sv, Sw, Sx, Sy, Sz) in antiparallel manner.

The power conversion device (2) includes a control circuit (14) for causing switching operations of the switching elements (Su, Sv, Sw, Sx, Sy, Sz) of the inverter circuit (13). The control circuit (14) is configured to output on/off signals to the switching elements (Su, Sv, Sw, Sx, Sy, Sz) based on a power supply voltage Vs of the AC power source (3), a voltage Vdc of the capacitor circuit (12), currents iu, iv, and iw to be detected by the three-phase AC motor (4), and an angular velocity ωm.

Figure 2:
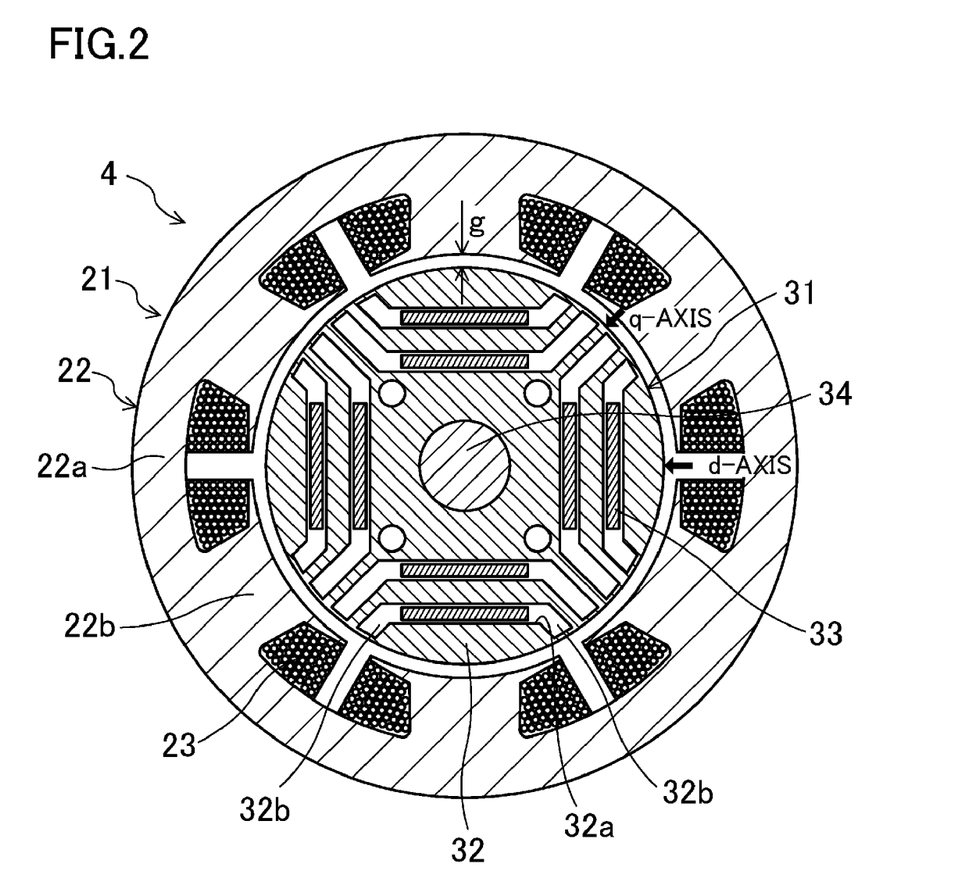
FIG. 2 is a cross-sectional view illustrating a schematic configuration of a three-phase motor.

The three-phase AC motor (4), which will be described in detail later, includes a stator (21) having a approximately columnar shape and a rotor (31) which is arranged inside the stator (21) and has an approximately cylindrical shape. Inside the rotor (31), a plurality of magnets (33) are buried. That is, the three-phase AC motor (4) is an interior permanent magnet type synchronous motor (IPM) in which the magnets (33) are buried inside the rotor (31).

—Configuration of Three-Phase AC Motor—

As described above, when the capacitor (12*a*) in the capacitor circuit (12) is a small capacitance capacitor which can smooth only a ripple voltage generated by switching operations of the switching elements (Su, Sx, Sw, Sx, Sy, Sz) of the inverter circuit (13), voltage fluctuations due to a power supply voltage of the AC power source (3) such as a voltage shown in FIG. 3A cannot be smoothed, and therefore, the voltage in a rippled state is input to the three-phase AC motor (4).

Then, since power to be supplied to the three-phase AC motor (4) is also rippled, ripple of a torque arises, the rotational speed of the three-phase AC motor (4) fluctuates, and vibration and noise generated in the three-phase AC motor (4) is increased. Moreover, since a current to flow in the three-phase AC motor (4) is also rippled, a copper loss generated in a coil of the three-phase AC motor (4) is greatly increased due to increase in substantial effective current and peak current, and also a magnetic flux generated in the three-phase AC motor (4) is rippled to greatly increase an iron loss.

As opposed to this, according to the present invention, the three-phase AC motor (4) is configured to absorb power fluctuations. That is, to allow the three-phase AC motor (4) to absorb the power fluctuations, the three-phase AC motor (4) is configured so that a q-axis inductance is larger than a d-axis inductance by a predetermined amount or more in the motor.

First, a reason why the power fluctuations can be absorbed by providing a difference between the q-axis inductance and the d-axis inductance in the three-phase AC motor (4) and causing the difference to be a predetermined amount or more will be described below.

When it is assumed that P is an average necessary power and f is a power supply frequency, a necessary storage capacitance Wc for smoothing rippled power can be expressed by:

$$Wc=P/(2f)/2\times pf.$$

where pf denotes the ratio of the total sum of a difference between power when the power exceeds an average power value and the average power during a certain amount time to the total sum of power during the certain amount of time. When the capacitance of the capacitor (12a) is zero, pf is about 0.07.

Based on the above equation, in a general air conditioner, for example, when P=1 [kW] and f=50 [Hz], Wc=0.35 [J] is obtained by substituting pf=0.07 therein.

In this embodiment, the three-phase AC motor (4) is an interior permanent magnet type synchronous motor in which the magnets (33) are buried in the rotor (31), and thus, has, in addition to a torque by the magnets (33), a reluctant torque generated by inductance components of the stator coil. The reluctant torque is equal to magnetic coenergy of a reluctant motor, and the energy WL can be expressed by:

$$WL=Pn\times\frac{1}{2}\times(Ld-Lq)\times id\times iq.$$

If the energy WL which can be stored in the inductance components in the three-phase AC motor (4) holds a relationship relative to the necessary storage capacitance We which is expressed by:

$$WL \geq Wc,$$

the power fluctuations can be absorbed by the three-phase AC motor (4).

For example, in a system where the average necessary power P=1 [kW] holds, when is it assumed that the motor voltage is 150 [V], the motor current phase is 30 [deg], the motor efficiency is 90 [%], the motor phase factor is 1, and the number of pole pairs is 2, the motor current I can be expressed by:

$$I=1000/0.9/1.0/(150\times sqrt(3))=4.28 [A].$$

A d-axis current and a q-axis current when the motor current is represented in terms of DC are respectively:

$$id=4.28\times sqrt(3)\times\sin(30)=3.7 [A]$$

$$iq=4.28\times sqrt(3)\times\cos(30)=6.42 [A].$$

Thus, the following equation holds.

$$WL=2\times\frac{1}{2}\times(Ld-Lq)\times 3.7\times 6.42 \geq 0.35$$

Therefore, the following equation holds.

$$|Ld-Lq| \geq 0.147 [H]$$

That is, when the difference between the q-axis inductance Lq and the d-axis inductance Ld is as described above, power fluctuations can be absorbed by the three-phase AC motor (4) under the above-described conditions. Thus, as shown in FIG. 3B, power in the three-phase AC motor (4) can be smoothed. The term "to smooth" herein means to cause power fluctuations to be within a range of ±10%, and if efficiency, etc, is considered, it is preferable to achieve fluctuations of 5% or less.

A specific configuration of the three-phase AC motor (4) which satisfies the above-described conditions will be described below with reference to FIG. 2.

As described above, the three-phase AC motor (4) includes the stator (21) having to an approximately cylindrical shape and the rotor (31) which is arranged inside the stator (21) and has an approximately columnar shape. The stator (21) includes a stator core (22) including a plurality of steel plates stacked, and a stator coil (23) which is wound around a part of the stator core (22). The stator core (22) includes a core back section (22a) having an approximately cylindrical shape, and a plurality of teeth sections (22b) are provided at an inner circumference side of the core back section (22a) so that each of the teeth sections (22b) inwardly protrudes. The stator coil (23) is wound around the teeth sections (22b).

FIG. 2 illustrates the stator (21) of a concentrated winding type as an example. However, the stator (21) is not limited to this type, but may be a stator of a distributed winding type where a stator coil is wound over a plurality of teeth sections together. In the example of FIG. 2, the number of slots in the stator (21) is six. However, the number of slots is not limited to six, but may be seven or more, or five or less.

The rotor (31) includes a rotor core (32) having an approximately cylindrical shape so that a rotation shaft (34) passes through the inside of the rotor (31) and the plurality of the magnets (33) which are stored in slots (32a) of the rotor core (32) and each of which is formed to have an approximately rectangular parallelepiped shape. Eight slots (32a) are formed in the rotor core (32) to be arranged in an approximately rectangular pattern and surround the rotation shaft (34) when viewed from the axis direction of the rotation shaft (34). The slots (32a) are formed so that two of the slots (32a) are arranged in parallel and each of the slots (32a) forms a chord of a circular arc of the rotor core (32) having an approximately cylindrical shape. Each of the slots (32a) is formed to have a size large enough to store an associated one of the magnets (33), and to pass through the rotor core (32) in the axis direction. Note that, as will be described later, magnetic flux barrier sections (32b) are provided at both end portions of each of slots (32a) to be bent outwardly in the radial direction of the rotor core (32).

As described above, two magnets (33) are arranged in parallel in the radial direction of the rotor (31), so that the q-axis magnetic flux can be further increased by the two magnets (33) while the d-axis magnetic flux further reduced.

Moreover, as shown in FIG. 2, the magnets (33) are arranged so that each of the magnets (33) forms a chord of a circular arc of the rotor core (32). Thus, the magnets (33) are arranged along a flow of the q-axis magnetic flux, so that leakage of the magnetic flux can be reduced and the q-axis magnetic flux can be increased.

The slots (32a) are provided at positions which do not cause saturation of the q-axis flux in the rotor (31). That is, as opposed to a conventional motor where magnets are arranged near an outer circumference of a stator core, the magnets (33) are arranged at positions in the rotor core (32) which do not cause a situation where the thickness of parts of the rotor core (32) located closer to the outer circumference of the rotor than the magnets (33) is increased to block the q-axis magnetic flux with magnetic resistance of the magnets (33) in the rotor (31).

Specifically, the magnets (33) are preferably arranged in the rotor core (32) so that each of parts of the magnets (33) provided closest to the center of the rotor (31) is located at a distance equal to or less than ½ of the thickness of a part of the rotor (31) serving as a magnetic pole in the radial direction. Note that the part of the rotor (31) serving as a magnetic pole corresponds to the rotor core (32) in this embodiment.

With the above-described configuration, saturation of magnetic flux in the rotor (31) can be prevented, and thus, the q-axis magnetic flux can be increased while the function as a motor is ensured.

When viewed from the axis direction of the rotation shaft (34), the magnetic flux barrier sections (32b) for preventing short-circuit of magnetic fluxes of the magnets (33) stored in the slots (32a) are provided at both of the end portions of each of the slots (32a). Specifically, the end portions of each of the slots (32a) includes parts which are bent outwardly in the radial direction of the rotor core (32) and the bent parts function as the magnetic flux barrier sections (32b). Note that the magnetic flux barrier sections (32b) are not limited to the parts of the slots (32a), but may be made of some other member which can prevent leakage of magnetic flux, and as another option, each of the magnetic flux barrier sections (32b) may include a plurality of portions.

Thus, as shown in FIG. 2, each of the slots (32a) in which the magnets (33) are stored and associated ones of the magnetic flux barrier sections (32b) are formed to form a circular arc shape in the rotor core (32), so that the q-axis magnetic flux can be further increased.

Figure 4:
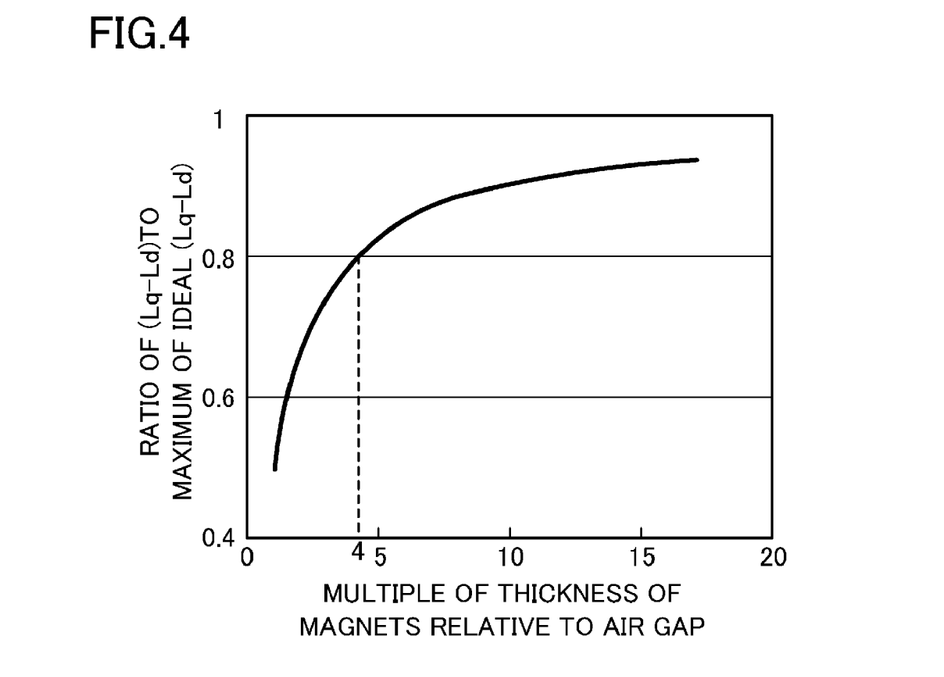
FIG. 4 is a graph showing the relationship between a multiple of the thickness of a magnet relative to an air gap and the ratio of a difference between Lq and Ld to an ideal difference between Lq and Ld.

In this case, the q-axis magnetic flux in the three-phase AC motor (4) is determined substantially ideally by a space, i.e., an air gap g between the rotor (31) and the stator (21), while the magnets (33) is configured to have a predetermined thickness relative to the air gap g, considering that the d-axis magnetic flux reduces as the thickness of the magnets (33) increases. Specifically, as shown in FIG. 4, as an multiple of the thickness of the magnets (33) relative to the air gap g increases, a difference between the q-axis inductance and the d-axis inductance (the ratio of a difference in inductance to an ideal difference in inductance when the thickness of the magnets (33) relative to the air gap g is infinitely increased in FIG. 4) increase. Therefore, the thickness of the magnets (33) is determined so that the difference in inductance becomes a value with which power fluctuations can be absorbed by the three-phase AC motor (4). Specifically, when the thickness of the magnets (33) is four times or more as large as the air gap g, a value equal to or larger than 80% of the ideal difference can be achieved, and therefore, the thickness of the magnets (33) is preferably four times or more as large as the air gap g.

A motor terminal voltage Va in the three-phase AC motor (4) and the magnetic flux φ in the motor are expressed respectively by:

$$Va = \text{sqrt}((\omega LqIq)^2 + \omega^2 \times (\varphi a + LdId)^2)$$

$$\varphi = \text{sqrt}((LqIq)^2 + (\varphi a + LdId)^2)$$

As understood from the above equations, when the difference between Lq and Ld is increased as described above, the magnetic flux φ in the motor is increased. Thus, when the magnetic flux φ is combined with the magnetic flux φa generated from the magnets (33) of the rotor (31), saturation of the magnetic flux and increase in the motor terminal voltage Va are caused. When the motor terminal voltage Va exceeds an input voltage of the inverter section (13), the three-phase AC motor (4) might lose speed and stop. Note that Id in each of the equations is a negative value, and even when Ld is reduced, φ is increased.

Therefore, the rotor (31) is configured so that the magnetic flux cpa generated from the magnets (33) of the rotor (31) is a magnetic flux with which the motor terminal voltage Va is equal to or less than the input voltage of the inverter section (13). Specifically, a magnet which generates such a magnetic flux φa is selected, and the slots (32a) to be provided in the rotor core (32) of the rotor (31) are formed to be slightly larger relative to the magnets (33) (to have a dimension which provides a marginal room relative to the thickness of the magnets (33)).

As described above, the slots (32a) are formed to be slightly larger relative to the magnets (33), so that an air layer provided between each of the magnets (33) and the rotor core (32) serves as a magnetic resistance, thus resulting in reduction in the magnetic flux φa generated from the magnets (33). Moreover, as described above, since the slots (32a) are formed to be slightly larger relative to the magnets (33), even when the dimension of the magnets (33) in the thickness direction varies, the magnets (33) can be stored in the slots (32a). Thus, it is not necessary to use accurately processed magnets, so that production costs can be reduced.

Note that, as described above, the motor may be configured not so that the magnetic flux φa generated from the magnets (33) is not caused to be a magnetic flux with which the motor terminal voltage Va is equal to or less than the input voltage of the inverter circuit (13) but so that the sum of the magnetic flux φa and a magnetic flux by an armature reaction due to the q-axis inductance and the d-axis inductance is caused to be a desired magnetic flux with which the motor terminal voltage Va is equal to or less than the input voltage of the inverter circuit (13).

Advantages of Embodiments

Based on the foregoing, with the above-described configuration, the three-phase AC motor (4) which is driven and controlled by the power conversion device (2) is configured so that the q-axis inductance is larger than the d-axis inductance by a predetermined amount or more to cause the three-phase AC motor (4) to absorb power fluctuations due to a power supply voltage which cannot be smoothed by the capacitor (12a) in the power conversion device (2). Thus, power fluctuations in the three-phase AC motor (4) can be reduced. Therefore, increase in vibration, noise and loss in the three-phase AC motor (4) due to power fluctuations can be prevented.

Specifically, in the three-phase AC motor (4), the magnets (33) are arranged in parts of the rotor (31) located closer to the rotation shaft (34) so that the q-axis magnetic flux is not blocked by the magnetic resistance of the magnets (33) in the rotor (31), and thus, the above-described difference between the q-axis inductance and the d-axis inductance can be realized while saturation of the magnetic flux in the rotor (31) is prevented. In particular, saturation of the magnetic flux in the rotor (31) can be greatly reduced by arranging the magnets (33) so that each of parts of the magnets (33) provided closest to the center of the rotor (31) is located at a distance equal to or less than ½ of the thickness of a part of the rotor (31) serving as a magnetic pole in the radial direction, and thus, reduction in motor performance due to saturation of the magnetic flux can be prevented, and the q-axis magnetic flux can be increased.

In the rotor (31), each of the magnets (33) and associated ones of the magnetic flux barrier sections (32b) are provided to form a circular arc shape in the rotor core (32) so that the q-axis magnetic flux can be formed. Thus, a difference between the q-axis inductance and the d-axis inductance can be more reliably achieved, and power fluctuations in the three-phase AC motor (4) can be more reliably smoothed.

Furthermore, the magnets (33) are provided so that two of the magnets (33) are arranged in parallel in the radial direction of the rotor (31), and thereby, the q-axis magnetic flux can be further increased while the d-axis magnetic flux can be further reduced.

Also, the thickness of the magnets (33) is made to be four times or more as large as the air gap g between the rotor (31) and the stator (21), and thus, the difference between the q-axis inductance and the d-axis inductance can be more reliably increased.

In the above-described configuration, the magnetic flux pa generated from the magnets (33) is caused to be a value with which the motor terminal voltage is equal to or larger than an input voltage of the power conversion device (2), so that saturation of the magnetic flux in the rotor (31) is prevented and also a situation where the motor terminal voltage exceeds an input voltage of the power conversion device (2) to cause the three-phase AC motor (4) to lose speed can be prevented.

Other Embodiments

The above-described embodiment may have the following configuration.

In the above-described embodiment, as an AC power source, a single phase AC power source (3) is used. However, the present invention is not limited thereto, and a three-phase AC power source may be used. In this case, as a matter of course, a converter circuit has to be formed of six diodes.

Figure 5:
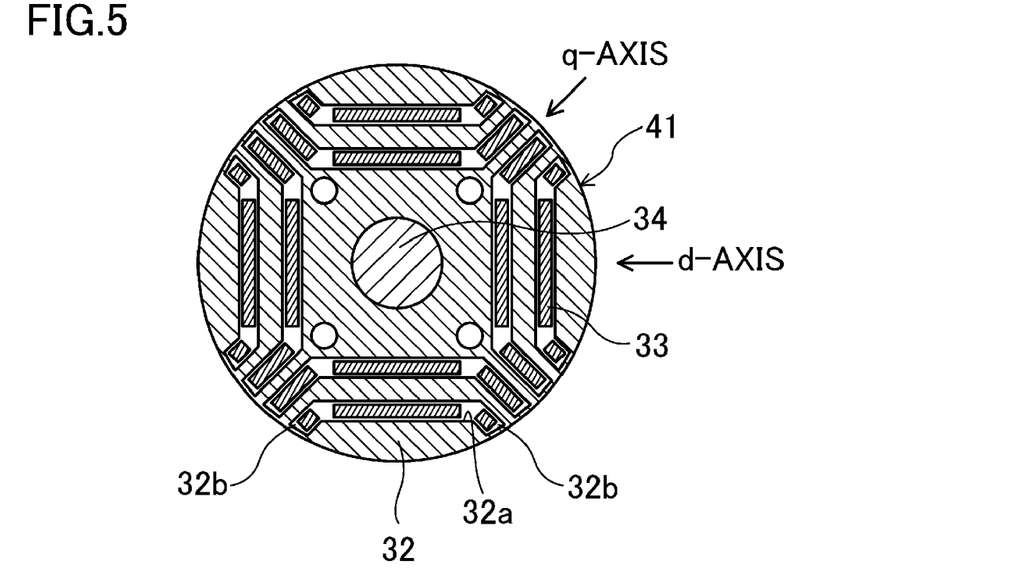
FIG. 5 is a cross-sectional view illustrating a schematic configuration of a rotor of a motor according to another embodiment.

In the above-described embodiment, the magnets (33) are formed so that each of the magnets (33) has a rectangular parallelepiped shape. However, the present invention is not limited thereto. The magnets (33) may be formed so that each of the magnets (33) has a circular arc shape to be arranged along an associated one of the smoothing capacitor (2b) and an associated one of the magnetic flux barrier sections (32b). Also, as shown in FIG. 5, in a rotor (41), the plurality of magnets (33) may be provided in the slots (32a) and the magnetic flux barrier sections (32b) to form a circular arc shape.

In the above-described embodiment, the magnets (33) are formed so that each of the magnets (33) has a rectangular parallelepiped shape with a uniform thickness. However, the present invention is not limited thereto. The magnets (33) may be formed so that a part of each of the magnets (33) which is likely to be demagnetized has a larger thickness. In this case, for example, the magnets (33) are formed so that a part of each of the magnets (33) which is likely to be demagnetized by a magnetic field generated by the stator (21) has a larger thickness. Furthermore, magnetic coercive force of the magnets (33) does not have to be uniform. In this case, a configuration in which demagnetization hardly occurs can be achieved by increasing the magnetic coercive force of a part of each of the magnets (33) which is likely to be demagnetized. On the other hand, the magnetic coercive force of a part of each of the magnets (33) which is hardly demagnetized is reduced to increase a residual magnetic flux density. Thus, the density of a magnetic flux from the magnets (33) can be increased, and the motor torque can be increased.

INDUSTRIAL APPLICABILITY

As described above, the present invention is useful, particularly when a motor is driven and controlled by a power conversion device including a capacitor having a static capacitance with which voltage fluctuations due to a power supply voltage cannot be smoothed but voltage fluctuations generated when a switching operation of an inverter circuit is performed can be smoothed.

DESCRIPTION OF REFERENCE CHARACTERS

1 Motor drive system
2 Power conversion device
3 AC power source
4 Three-phase AC motor (Motor)
11 Converter circuit (Converter section)
12a Capacitor
13 Inverter circuit (Inverter section)
21 Stator
31, 41 Rotor
32 Rotor core
32b Magnetic flux barrier section
33 Magnet
g Air gap

The invention claimed is:

1. A motor which is driven and controlled by a power conversion device including a converter section configured to rectify AC power of an AC power source, an inverter section including a plurality of switching elements and configured to perform switching operations of the switching elements to convert output power of the converter section into AC power at a predetermined frequency, and a capacitor provided in an output side of the converter section and having a static capacitance with which voltage fluctuations of an output from the converter due to a power supply voltage of the AC power source cannot be smoothed but power fluctuations caused when the switching operations of the switching elements are performed can be smoothed within a range of ±10 percent, wherein the motor includes a rotor having a plurality of magnets buried therein, the magnets positioned such that a q-axis inductance Lq and a d-axis inductance Ld produced in the motor satisfies a relationship expressed by:

$$Lq-Ld>2Wc/(Pn \times id \times iq)$$

where parameters in the right side of the expression are based on an average necessary power, We is a necessary storage capacitance for smoothing the power fluctuations, Pn is the number of pole pairs, id is a d-axis current, and iq is a q-axis current.

2. The motor of claim 1, wherein a magnetic flux generated from the magnets is a predetermined magnetic flux with which a motor terminal voltage is equal to or less than an input voltage of the power conversion device.

3. The motor of claim 1, wherein the magnets are arranged at positions in a radial direction of the rotor so that a q-axis magnetic flux in the rotor is not blocked by a magnetic resistance of the magnets.

4. The motor of claim 3, wherein
the magnets are arranged in the rotor so that each of parts of the magnets provided closest to a shaft center of the rotor is located at a distance equal to or less than ½ of a thickness of a part of the rotor serving as a magnetic pole in the radial direction.

5. The motor of claim 1, wherein
the rotor includes magnetic flux barrier sections configured to prevent a short-circuit of a magnetic flux between the plurality of magnets, and
the magnets and the magnetic flux barrier sections are arranged along a flow of a q-axis magnetic flux.

6. The motor of claim 1, wherein
a thickness of the magnets in a radial direction of the rotor is four times or more as large as an air gap between the rotor and a stator.

7. The motor of claim 1, wherein the magnets are provided along a flow of a q-axis magnetic flux in the rotor so that two or more of the magnets are arranged in parallel in a radial direction of the rotor.

8. A motor drive system, comprising:
a power conversion device including a converter section configured to rectify AC power of an AC power source, an inverter section including a plurality of switching elements and configured to perform switching operations of the switching elements to convert output power of the converter section into AC power at a predetermined frequency, and a capacitor provided in an output side of the converter section and having a static capacitance with which voltage fluctuations of an output from the converter due to a power supply voltage of the AC power source cannot be smoothed but power fluctuations caused when the switching operations of the switching elements are performed can be smoothed within a range of ±10 percent; and
the motor of claim 1.

* * * * *